(12) United States Patent
Wodtke et al.

(10) Patent No.: US 7,593,992 B2
(45) Date of Patent: Sep. 22, 2009

(54) ORGANIZER OR E-MAIL AND WORKFLOW INTEGRATION

(75) Inventors: Dirk Wodtke, Aptos, CA (US);
Matthias Kruse, San Francisco, CA (US)

(73) Assignee: SAP AG, Walldorf (DE)

( * ) Notice: Subject to any disclaimer, the term of this patent is extended or adjusted under 35 U.S.C. 154(b) by 741 days.

(21) Appl. No.: 11/022,343

(22) Filed: Dec. 23, 2004

(65) Prior Publication Data

US 2006/0143270 A1     Jun. 29, 2006

(51) Int. Cl.
*G06F 15/16* (2006.01)
(52) U.S. Cl. .................................. 709/206
(58) Field of Classification Search .............. 709/206
See application file for complete search history.

(56) References Cited

U.S. PATENT DOCUMENTS 6,336,125 B2 * 1/2002 Noda et al. ................. 715/246

2004/0243677 A1 * 12/2004 Curbow et al. ............. 709/206

* cited by examiner

*Primary Examiner*—William C Vaughn, Jr.
*Assistant Examiner*—Scott Christensen
(74) *Attorney, Agent, or Firm*—Fountainhead Law Group PC (57) ABSTRACT

In a computer system wherein messages are transferred between participants, at least some of which are human users of the computer system using the computer system in furtherance of work projects, and wherein a workflow system handles task-based operations in a structured environment, tasks embodied in messages are handled as tasks in the structure environment by transforming messages into workflow items. One embodiment provides for sending a message from a sender to a user computer system; upon review of the message at the user computer system by a user, accepting input from the user representative of a trigger for transforming the message content to a workflow object, wherein the workflow object is a structured representation of one or more tasks to be performed by one or more assignees including linkages between tasks; following a trigger for transforming, accepting user input as needed to obtain task-related information other than information present in the message; once the user input is obtained, generating one or more workflow objects for tasks representing by the message; and providing the one or more workflow objects to a workflow system for workflow handling.

25 Claims, 5 Drawing Sheets

ORGANIZER OR E-MAIL AND WORKFLOW INTEGRATION

BACKGROUND OF THE INVENTION

Collaboration takes place whenever humans and/or computer applications work together to accomplish a common goal or compatible goals. For the last two decades, many organizations and individuals have considered electronic collaboration of distributed teams one way to achieve higher productivity and improve the quality of their work products. Various collaboration technologies have been introduced to provide solutions in the areas of electronic communication, coordination, and content sharing. However, comprehensive solutions that fully realize the promises of electronic collaboration remain an elusive goal.

Computerized workflow systems allow for collaboration that can be organized, structured and repeated, all of which supports accountability and efficiency. Of course, even with a single actor, workflow systems have benefits in the organization and structure of work. In some workflow systems, workflow is a structured into instances and in a large structured workflow system, thousands of workflow instances might be processed daily.

A workflow item is a unit of a workflow system. A workflow item might represent a task that involves interaction among participants. Examples of tasks might be a team leader assigning an operation to a team member, doing the operation (performed by the team member assigned to the operation), reviewing the results of the operation (performed by a reviewer who might be the team leader, the team member or another person), signing off on the completion of the operation, tracking the task, etc.

A workflow process is a collection of tasks and links between them, where a link might provide order dependencies among tasks, rules and/or data to link tasks. For example, the tasks listed above might be part of a process wherein the team leader assigns, which triggers the start of the doing of the operation, the completion of which triggers the need for review, which must occur before the signing off, while tracking can be done between the assignment and the signing off (or some other rule might apply). One workflow process might be reused many times for unrelated operations. Operations themselves might be performed using workflow processes, typically depending on complexity.

A workflow system provides each participant with an interface where actions to be done might be presented, prioritized and tracked. A workflow system might be organized in a client-server structure, with the server maintaining process templates, instances of ongoing processes, workflow items for each user and logic to present a user with his or her workflow items, via a client system. SAP's Netweaver™ system provides an example of a workflow system.

Structured workflow has advantages of being trackable and testable. Structured workflow is trackable in that an analyst can later determine how a process proceeded and can identify other performance data and data underlying the work being done. In a typical arrangement, users have access to structured systems, such as a workflow management system and communication systems such as e-mail systems, instant messaging systems, and the like. In such environments, the communication system is used by collaborators for messaging, but might on occasion be used for noncommunication actions, such as tasks. For example, a team leader might send an e-mail to a team member requesting the start of an operation, then the team leader might separately follow up with review of the operation manually, which leads to difficulties in tracking operations, auditing and other benefits of a structured workflow.

BRIEF SUMMARY OF THE INVENTION

In an interaction system including a workflow system, a messaging system provides messages to participants (typically human users of the interaction system) and messages can be transformed into workflow items inputtable to the workflow system. If information not present in the message is needed for input of one or more complete workflow items, that information can be deduced, derived from templates and/or obtained from a participant who opts to transform a message into a workflow item.

Participants can be human users, automated participants or proxies interfacing human users to the interaction system. In one embodiment, the interaction system is a network connecting business collaborators. One such system is SAP's NetWeaver comprehensive integration and application platform, usable to flexibly and rapidly design, build, implement, and execute new business strategies and processes. Other business suites might be used.

With improved interaction systems described herein, messages such as e-mail messages, and possibly threads of messages, can be transformed to workflow items for more structured handling. A workflow engine handles imposing and executing control flow dependencies between tasks.

In a computer system wherein messages are transferred between participants, at least some of which are human users of the computer system using the computer system in furtherance of work projects, and wherein a workflow system handles task-based operations in a structured environment, tasks embodied in messages are handled as tasks in the structured environment by transforming messages into workflow items. One embodiment provides for sending a message from a sender to a user computer system; upon review of the message at the user computer system by a user, accepting input from the user representative of a trigger for transforming the message content to a workflow object, wherein the workflow object is a structured representation of one or more tasks to be performed by one or more assignees including linkages between tasks; following a trigger for transforming, accepting user input as needed to obtain task-related information other than information present in the message; once the user input is obtained, generating one or more workflow objects for tasks representing by the message; and providing the one or more workflow objects to a workflow system for workflow handling.

A further understanding of the nature and the advantages of the inventions disclosed herein may be realized by reference of the remaining portions of the specification and the attached drawings.

BRIEF DESCRIPTION OF THE DRAWINGS

The included figures describe aspects of the present invention.

DETAILED DESCRIPTION OF THE INVENTION

In a structured workflow system, a project is defined by a set of processes, each of which might have multiple steps, tasks, triggers and/or actions (work items). A workflow engine provides mechanisms for executing and scheduling the work items in a defined way. Workflow processes can be simple or complex. A simple workflow process is "Assign task A to member M, and after the assignment, M performs the task." A more complex workflow process might be "Execute task B after task A, but only if the value of X is greater than Y or member M is not in a state of 'on vacation'. In all other cases, execute task C immediately after task A. Task D follows the completion of tasks A, B and C."

The workflow engine handles imposing and executing control flow dependencies between tasks according to process workflows. Process workflows can be set up by an administrator, set up by an end user, or set up by an administrator with end user permissions to modify the process. Tasks are used in a broad variety of end user scenarios. The life cycle of a task might be jointly defined by the task creator and process participants (if task assignees are allowed to deviate from the task behavior defined by the creator). Tasks can be atomic (single step), multi-step and/or nested (i.e., represent processes themselves comprising atomic tasks or nested tasks).

Many tasks and e-mails are feedback gathering processes. Examples of feedback gathering include organizing a meeting or an event, having meeting participants provide feedback by accepting or rejecting a meeting request, having meeting participants provide feedback by discussing meeting topics during the meeting. Meeting follow-ups are also feedback.

Document approval processes are also instances where tasks are feedback, as approvers provide feedback by approving or disapproving documents. Other tasks that might be thought of as feedback actions include organizing task forces, since nominators provide feedback by nominating task force members and nominees provide feedback by accepting or rejecting their nominations. Of course, there is also the generic feedback process where people are invited to provide feedback.

Many of these feedback activities currently take place via messaging, such as via e-mail. This is less than optimal, as the activities are not tracked, task execution might not be enforced, tasks might be lost or forgotten (which typically happens with an In Box containing hundreds of unopened e-mails). Task behavior should be controlled by a workflow engine to have these benefits. Other functions also come into play, such as linking tasks with applications (application screens, business objects, etc.).

Once feedback and other task-generating communications are handled by a workflow system, a user can then ask questions such as:

Is there anything I have to do now?

I'm going away next week—what do I need to hand off?

Am I doing anything involving X (I'm seeing him this afternoon)?

What has changed since I last planned my workload?

Figure 1:
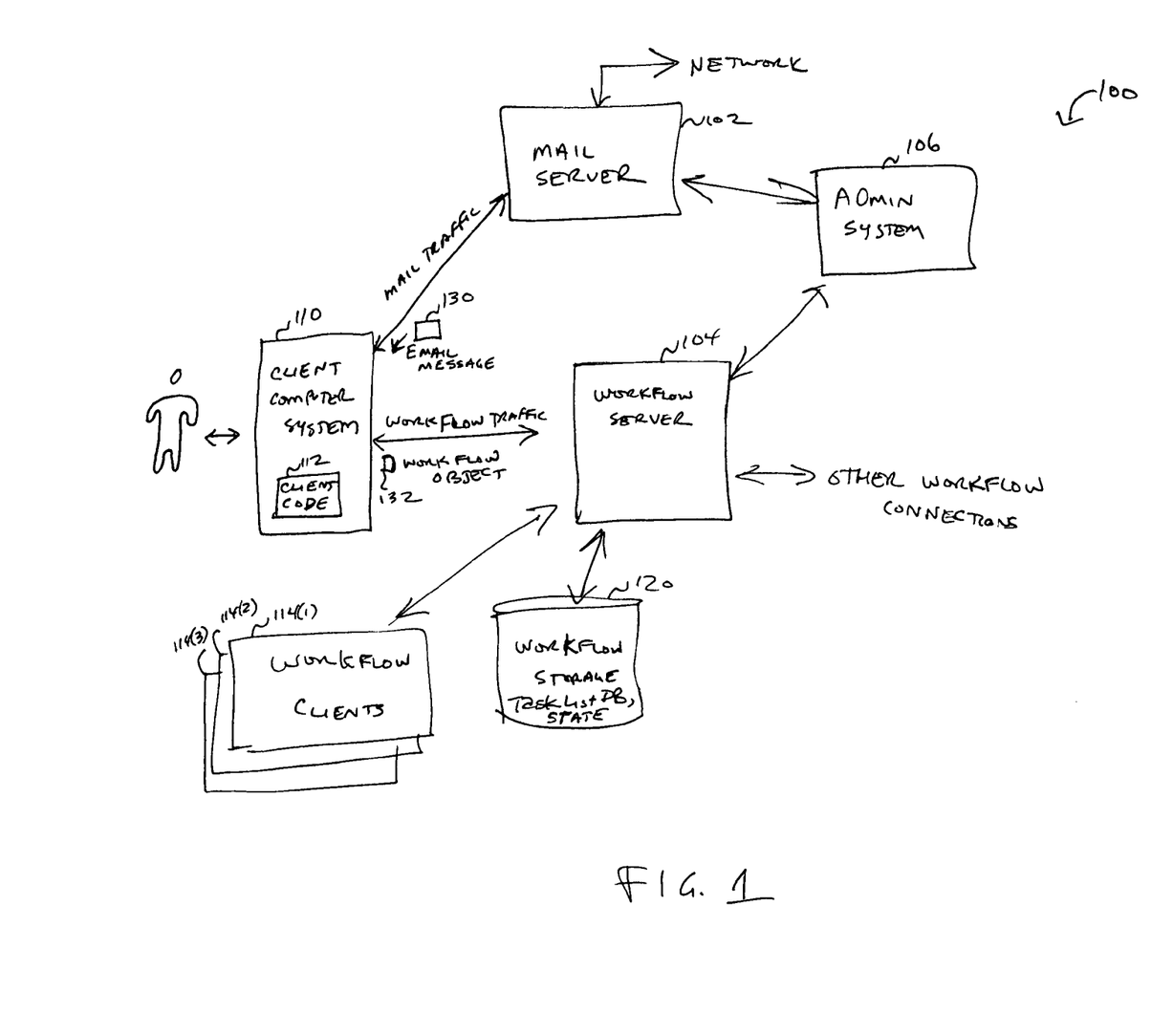
FIG. 1 is a block diagram of portions of an interaction system according to embodiments of the present invention.

FIG. 1 is a block diagram of an interaction system 100. As shown, interaction system 100 includes a mail server 102, a workflow server 104 and an administrative system 106. It should be understood that interaction system 100 might include other systems for facilitating user interaction and other systems usable for other purposes, such as data management and analysis. For example, interaction system 100 might be part of a business suite that includes many other components.

Interaction system 100 is also shown comprising a client computer system 110 and it should be understood that a plurality of client computer systems would typically exist to allow many users to interact with interaction system 100. Also shown in FIG. 1 are a plurality of a workflow clients 114 and workflow storage 120. Workflow clients 114 might be used for conventional interaction with workflow server 104, such as to update tasks, review tasks or further the workflow operations. Workflow storage 120 can comprise storage, in a structured database or other data structure, for task lists, workflow states, process descriptions, process templates and the like. Workflow clients 114 can be separate from client computer systems or part of the client computer systems.

As shown, client computer system 110 includes client code 112 that provides various functionalities, such as the functionalities described in later figures. For example, client computer system 110 might include an e-mail client for reading e-mail messages such as e-mail message 130 received from mail server 102 and a workflow client for interacting with workflow server 104. Administrative system 106 might be used to configure mail server 102 and workflow server 104. A number of different workflow clients are possible In interactions with workflow server 104, users can view tasks, change state of tasks (from pending to done, removed, transferred, obsoleted, etc.) and the like. The tasks, state information and other data needed or used in the workflow process is stored in storage 120. Storage 120 might also include storage for standard workflows and custom workflows.

Using these components, a user can perform tasks in structured manner and have progress tracked by the workflow system. To provide some structure for users to start with, templates stored in storage 120 by administrative system 106 might be coupled to workflow server 104.

In some embodiments, storage 120 might comprise several distinct storage areas, such as databases or other data or file storage. Other variations and organizations are also possible. For example, the workflow system might be integrated with a portal server.

In operation, client computer system 110 might receive an e-mail message 130 and based thereon, generate a workflow object 132 that is transmitted to workflow server 104. The transformation of an e-mail message to a workflow object can be triggered by manual user decision, automated analysis of the e-mail message, or a combination thereof. It should be understood that while many of the examples of messages are e-mail messages, other forms of messaging are contemplated and transformations can be done of those e-mail messages. In a specific embodiment, mail server 102 is a groupware product providing e-mail, calendaring, contact management and note storing, such as the Microsoft Exchange Server wherein the messaging clients might be Microsoft Outlook programs. Other e-mail systems might be used instead, such as web-based e-mail systems, stand-alone e-mail only systems, hand-held devices (such as organizers and/or telephones) with messaging capabilities, etc.

Figure 2:
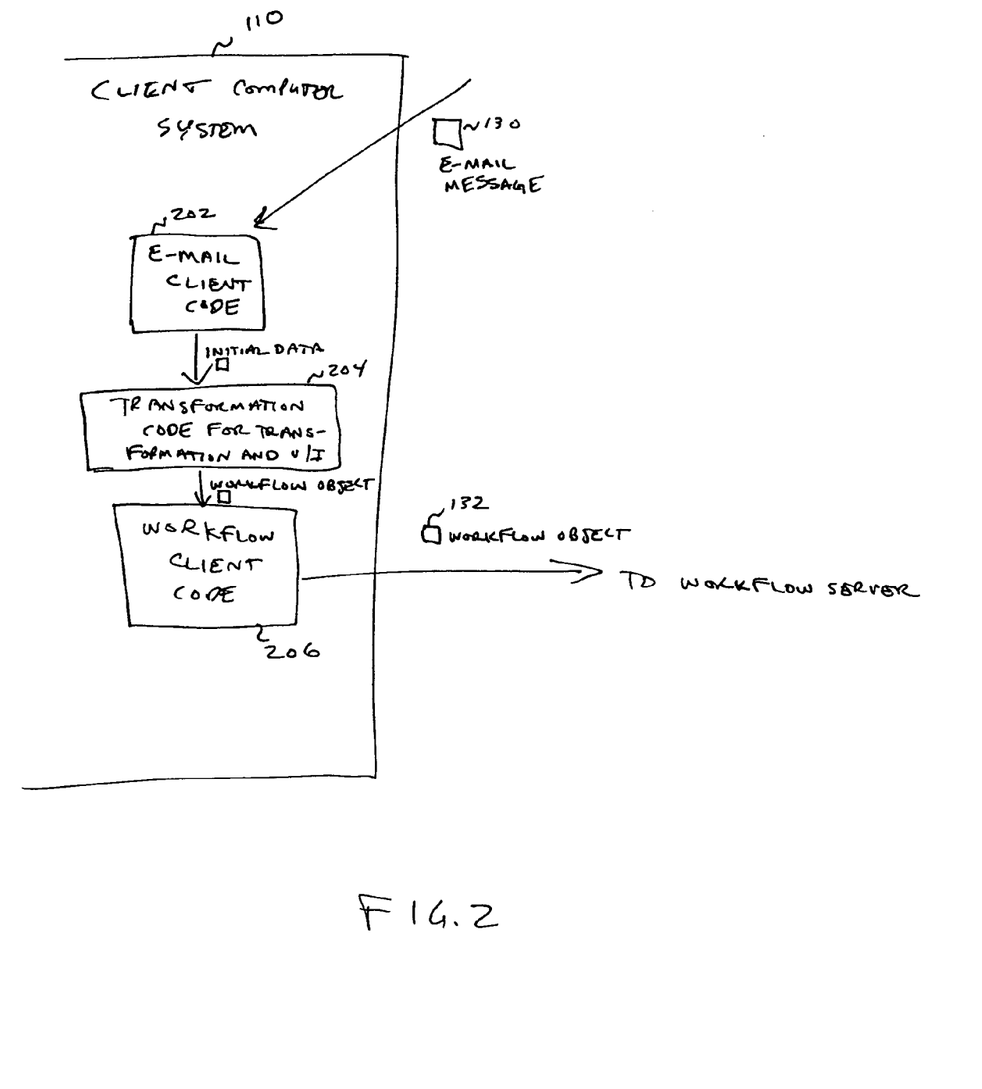
FIG. 2 is a block diagram illustrating in greater detail portions of elements shown in FIG. 1.

FIG. 2 illustrates some aspects of interaction system 100 in greater detail. As shown there, an e-mail message 130 is received by an e-mail client implemented from e-mail client code 202 on client computer system 110. In response to a transformation trigger, the e-mail client provides a packet of initial data to a transformer implemented from transformation code 204, which in turn generates a workflow object that is provided to workflow client code 206 for generation of workflow object 132 that is provided to the workflow server (not shown). While in some cases, the workflow client might perform some process on the data received from the transformer, in other cases the workflow client might just be a pass-through of a workflow object.

Figure 3A:
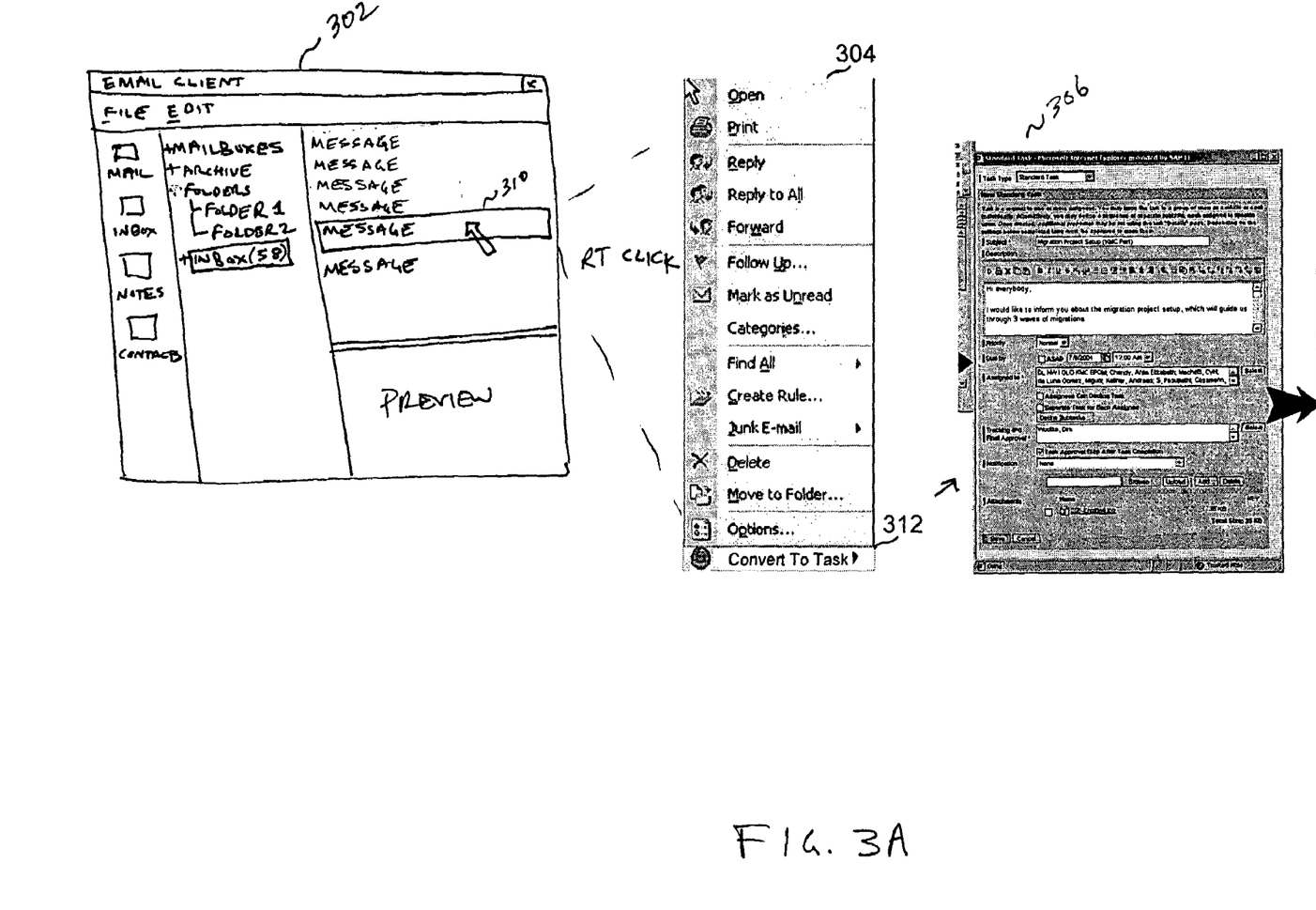
FIG. 3 illustrates user interface elements that might be used to initiate a transformation of an e-mail from an e-mail system to a workflow item in a workflow system.

As mentioned above, the trigger that initiates a transformation can be a user trigger initiated by an end user upon reading an e-mail. This is illustrated in the user interfaces shown in FIG. 3. FIG. 3A shows an e-mail client user interface 302, a context menu 304 and a transformer data entry panel 306. When a user receives a message, such as message 310, where the user deems the message to be a task or work item, the user can right-click on the message and client computer system 110 would present the user with a context menu. As shown, a number of e-mail specific menu items might be provided, but a transformation triggering menu item 312 is also provided. Upon user selection of the triggering menu item, client computer system 110 presents transformer data entry panel 306.

Figure 3B:
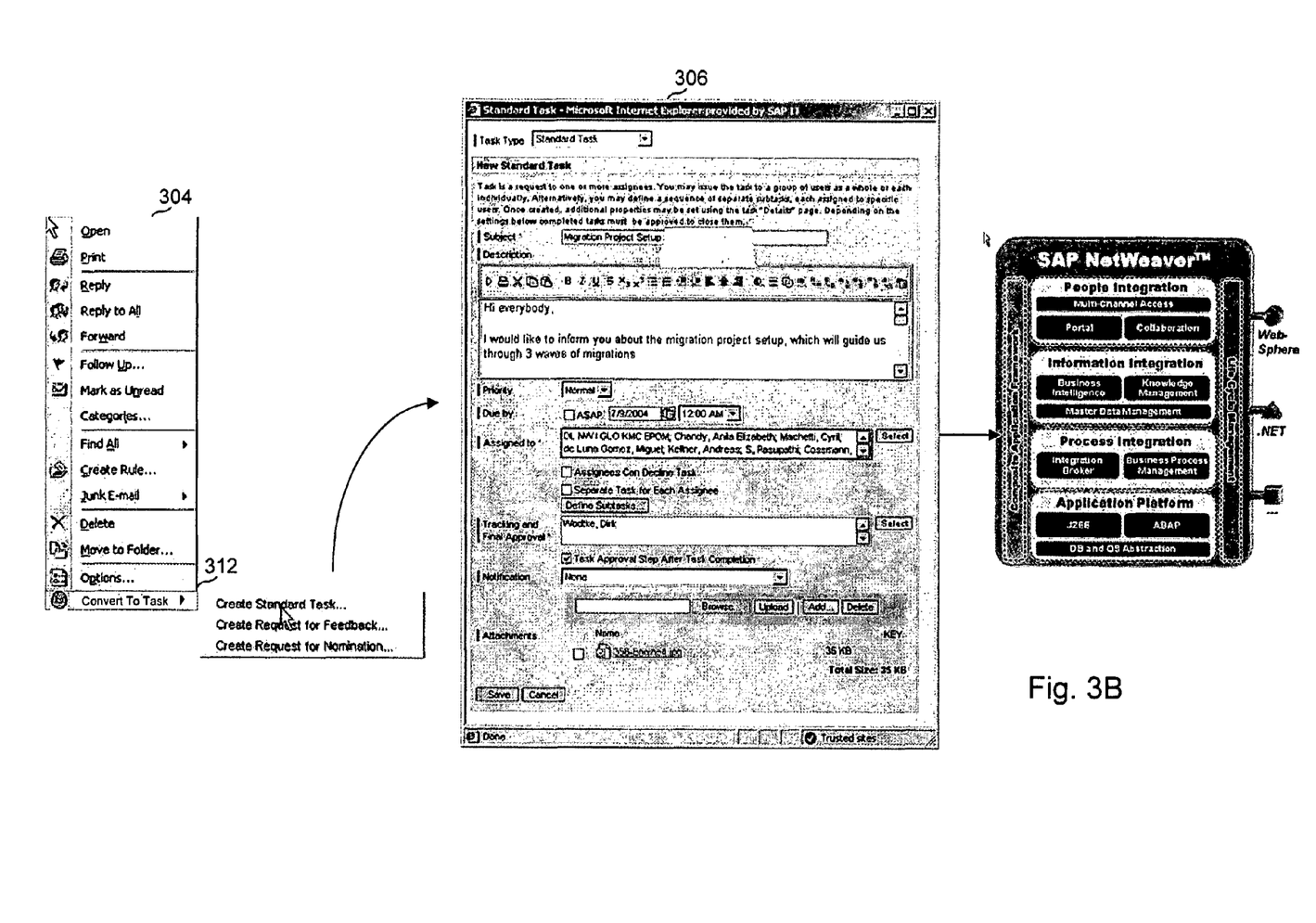
FIG. 3B shows components of FIG. 3A in larger detail.

FIG. 3B shows transformer data entry panel 306 in larger detail. As shown there, the user can trigger the creation of various types of workflow objects. The data fields of the workflow object are prepopulated with data from the e-mail message and the user can add additional data in the fields provided.

As examples of user added information, an e-mail typically does not include deadline information, assignee information or dependency information, or if it does include such information, the information is in unstructured form. For example, the body of an e-mail might have freeform text that might mention deadlines and possible assignees.

The user can indicate which type of task to generate. In FIG. 3, task types are indicated, where the first is a standard task, the second is a request for feedback and the third is a request for nomination. It should be understood that other task types are also possible. In some embodiments, users might also be allowed to generate their own preconfigured task types.

Templates

As users convert e-mails to tasks, the transformer might maintain records of how and when transformations are done, to automate later transformations. For example, the transformer might generate workflow templates based on past transformations and possibly also based on identifying e-mail "conversations" in e-mail messages. For example, by identifying back and forth comments represented in different portions of an e-mail message, the transformer could identify a suitable template.

As an example, once a user decides to transform an e-mail into a task, the transformer might make a note that the e-mail is a thread comprising a reply to a reply of a reply and infer that the process involves three tasks, each associated with the sender of each reply. The user might be presented with a template inferred from the e-mail thread and be allowed to modify the template. In this manner, the transformer captures a process from an e-mail thread.

In effect, the transformer extracts control flow information from the threads and uses that for generating workflow items. The transformer and/or the workflow system might generate templates of a many-task process from the thread for use in future transformation steps.

As an example of a thread transformation, a transformer might recognize participants mentioned in an e-mail thread and generate a corresponding process that involves inviting the right people to interact at the right time in the right order. In a simple approach, the headers of e-mails are used to parse e-mails and identify participants. Even disparate e-mails can be grouped and processed as a thread, such as by examining relative dates and subject lines. Once a set of e-mails are identified as a thread, or e-mails are parsed into separate actions, they can be matched and compared and a logical graph generated indicating which actions happen with whom and in what order. That information can be used to generate a workflow process.

For example, suppose the following e-mail thread occurred and each e-mail contains a copy of the previous thread components:

E-mail 4: e-mail type: normal e-mail, receiver: user v

E-mail 3: e-mail type: normal e-mail, receiver: user w, x

E-mail 2: e-mail type: e-mail with voting buttons "yes" and "no", receiver: user y E-mail 1: e-mail type: meeting request, receiver: user z A matching workflow template could be generated from e-mail 4:

template "Meeting+Approval+Follow-up actions":

step 1 (meeting request, single user)

step 2 (approval request, single user)

step 3 (action item, multiple users)

step 4 (action item, single user)

From an automatically or semi-automatically generated template, the user can assign an e-mail thread a name and that name could also be assigned to the generated workflow process. The user might then be allowed to optimize the template, such as by moving steps up, down, deleting steps or adding steps.

The template might also include information about when a document was added to the thread so the workflow system can manage attachments and attach documents at the appropriate point in the workflow process.

Integrated User Interface Client

The presentation of tasks in a workflow system and the presentation of e-mails in an e-mail client have common attributes, such as that items are atomic, appear in lists, can be categorized into a hierarchical folder/topic system, viewed and manipulated. As such, in some embodiments, tasks and e-mails might be shown in the same integrated user interface. For example, when the e-mail system is an Outlook/Exchange system, workflow tasks might be presented in the Outlook user interface, under separate tabs or folders.

Searching Tasks Taking Into Account Process Information

Task searching is a typical feature of a workflow system. For example, a typical workflow system might allow a user to search for all tasks with due dates having a given range and assigned to a particular participant. In some cases, an external search system might be used to handle search is when the workflow system is not available or to provide search functionality not available in the workflow system. For example, complex text searching systems that crawl and index hyperlinked documents are often more advanced than simple task searching systems. Merely searching over the text of task descriptions would be of less usefulness than being able to search tasks taking process information into account.

In one embodiment, task data is generated in a searchable form with related process information provided as metadata, thus allowing a text search system to search task data. The related process information might be included as text metadata, further simplifying the search process.

As an example, SAP's Trex fuzzy searching system can search for text and order search results by relevance. By allowing the search system to search process data (i.e., workflow items/tasks and their related process data), the search system can provide more workflow-centric results. A process trace might ask who did what and when they did it. By taking into account task process data, such queries can be applied to task data with useful results.

Variations

Figure 4:
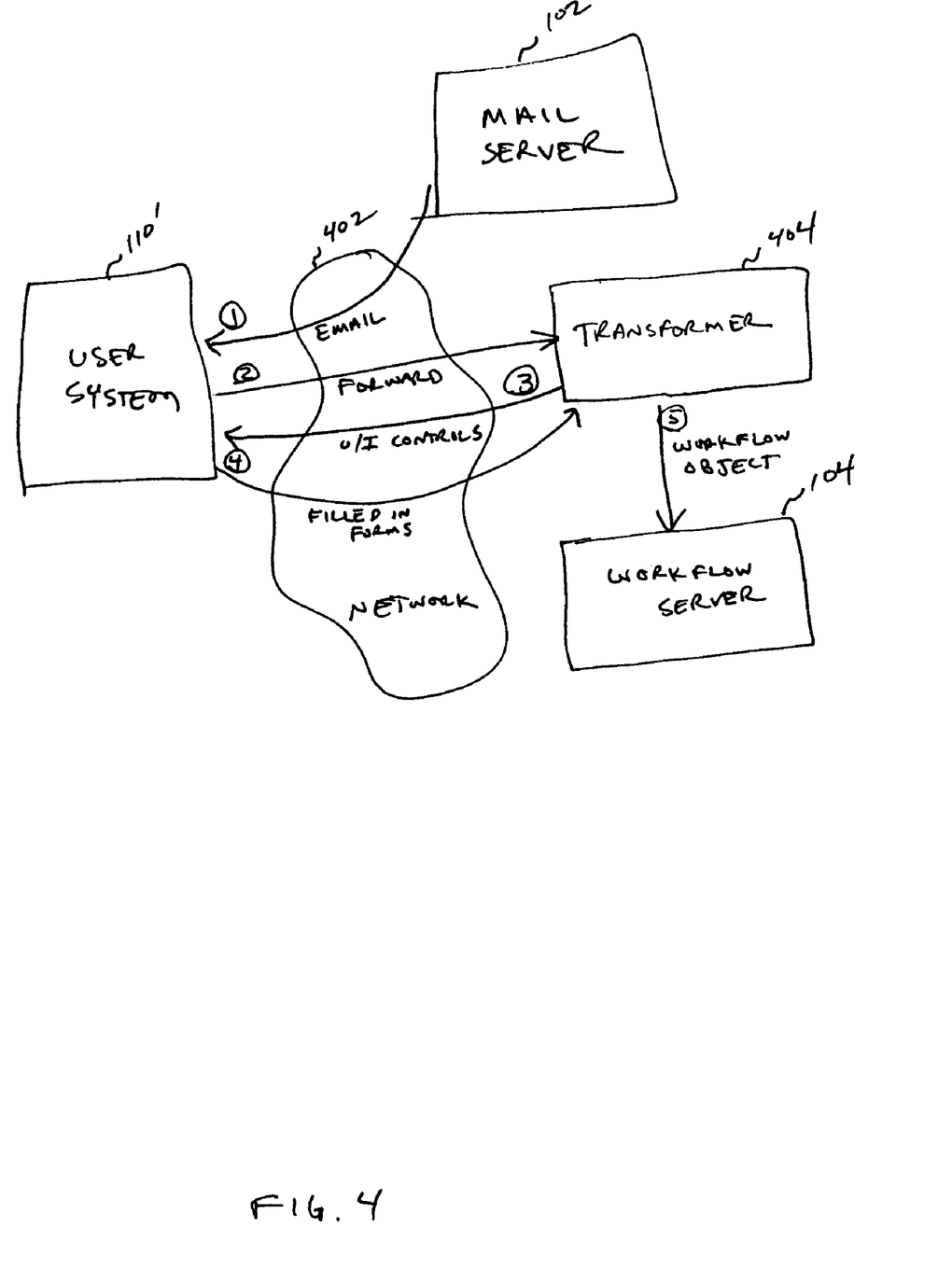
FIG. 4 illustrates a variation of an interaction system wherein transformation is done remotely from a user system where a user initiates a transformation.

FIG. 4 is a block diagram showing an alternative arrangement wherein transformation is done remote from a user system 110' in a transformer 404. As illustrated by the numbered arrows, mail server 102 sends an e-mail to the user system (step 1) and the user decides to transform the e-mail into a workflow object. Upon initiating the trigger, the user system forwards the trigger to transformer 404 (step 2) and transformer 404 replies with user interface controls that allow a user at the user system to enter workflow and data associated with the transformed workflow item (step 3). The filled in data, such as filled in form data, is transmitted to transformer 404 (step 4). Following that, transformer 404 generates a workflow object and provides it to workflow server 104 (step 5). In this manner, messages can be transformed into workflow on objects using user input but without requiring transformation functionality to be resident at the user system.

Users might interact with one or more workflow clients, such as the Universal Worklist ("UWL"), described in more detail in U.S. Publication number US2005/0033626 and entitled "Universal Worklist Service and User Interface", which is incorporated by reference herein for all purposes. The workflow clients might interact with a Java workflow service API layer of a workflow server, which interacts with a core layer that in turn interacts with workflow objects, data and other structures.

The workflow engine might include a template generator for creating new versions of a process definition when an end user modifies the process definition to accommodate local conditions. After the creation of a new template version, the run-time information of the process instance is merged into the new process definition. Thus, the next activity in the process instance already adheres to the new version of the process definition.

Workflow might include simple rules, such as rules for delegation, substitution, escalation, scheduling per step, etc. and more complex operations such as parallelization, use of alternatives, conditional operations, etc. System administrators might provide templates that can be used to make process instances, including, for example, steps to take, notifications to make, and other work items. With tasks tracked as workflow rather than as e-mails, auditing and tracking tasks is simplified.

One workflow engine, as described herein, is developed in Java and runs on SAP's web application server WebAS 6.20 and 6.30. It includes an easily configurable approval process for document approvals in a Knowledge Management application (KM) and user self registration in a User Management Engine (UME). In a specific implementation, the workflow engine enables a universal worklist in a portal (UWL).

Work items can represent manual steps (similar to knowledge management tasks) or computerized steps where the work item owners are supposed to enter data in application screens and to hit application buttons. A workflow work item represents a piece of work assigned to one user or a set of users by a workflow system. Work items unambiguously belong to workflow instances (instantiated workflow definitions) and keep references to the definition of the work. Work items are often accessible to end users through devices such as a UWL that allows for searching, filtering and manipulation operations such as forward, reject, execute, resubmit, etc.

In addition to executing manually work items, users can set up rules that automate the processing of work items that are transformed from messages, as with other workflow items. These rules can refer to a variety of data sources, such as work item attributes (e.g., creation date, work item type, creator of the work item, etc.), an associated business object and its attributes (e.g., document, length of a document, purchase order, amount of a purchase order, etc.), and context of the belonging workflow instance (preceding step in the process, due date of the process, etc.). This additional information about workflow items can be auto-generated, manually entered or combination thereof.

In some embodiments, work items can be turned in to e-mail items, albeit with loss of structure for the workflow process used with the work items.

While the present invention has been described using a particular combination of elements, it should be recognized that other combinations of elements are also within the scope of the present disclosure. The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. In a computer system wherein messages are transferred between participants using a messaging system, at least some of which are human users of the computer system using the computer system in furtherance of work projects, and wherein a workflow system handles task-based operations in a structured environment, a method of handling tasks embodied in messages as tasks in the structure environment, the method comprising:

sending a message from a sender to a user computer system;

upon review of the message at the user computer system by a user, accepting input from the user representative of a trigger for transforming the message content to a workflow object, wherein the workflow object is a structured representation of one or more tasks to be performed by one or more assignees including linkages between tasks, wherein said inkages between tasks provide at least one of order dependencies among said tasks or rules to link said tasks;

following a trigger for transforming, accepting user input as needed to obtain task-related information other than information present in the message;

once the user input is obtained, generating one or more workflow objects for tasks represented by the message; and providing the one or more workflow objects to a workflow system for workflow handling, including:

sending the one or more workflow objects to a first assignee associated with the one or more workflow objects, receiving the one or more workflow objects from the first assignee after the first assignee has performed a first task associated with the one or more workflow objects, sending the one or more workflow objects to a second assignee associated with the one or more workflow objects according to a first linkage between the first task and a second task, and receiving the one or more workflow objects from the second assignee after the second assignee has performed the second task.

2. The method of claim 1, wherein the messaging system is one of an e-mail system, an instant messaging system, and an integrated collaboration system.

3. The method of claim 1, wherein the messaging system includes functions other than messaging.

4. The method of claim 3, wherein the functions other than messaging include calendaring, contact management and note management.

5. The method of claim 1, further comprising:
analyzing the message to determine if a transformation might be warranted; and
prompting the user to consider transforming the message.

6. The method of claim 1, wherein the trigger is the user selecting a user interface item to signal a desire to transform a message into a workflow object.

7. The method of claim 6, wherein the user interface item is a context menu.

8. The method of claim 1, further comprising:
analyzing one or more messages to detect a thread of one or more related messages or message parts; and
generating a workflow item or items representing a multi-task process corresponding to the detected thread.

9. The method of claim 8, further comprising storing templates for detected multi-task processes for later comparison against future threads.

10. The method of claim 9, further comprising matching templates from prior threads against a current thread to affect generation of workflow items when such templates match a current thread.

11. A computer program stored on a computer readable tangible medium for execution on a computer system including a messaging system and a workflow system, wherein messages are transferred between participants using the messaging system, at least some of the participants are human users of the computer system using the computer system in furtherance of work projects, and wherein the workflow system handles task-based operations in a structured environment, the computer program comprising:
a trigger interface that allows users to indicate when a message is to be transformed into a workflow object;
a transformer coupled to the trigger interface that accepts user input for workflow information not extractable from the message;
logic for transforming the message content to a workflow object,
wherein the workflow object is a structured representation of one or more tasks to be performed by one or more assignees including linkages between tasks,
wherein said inkages between tasks provide at least one of order dependencies among said tasks or rules to link said tasks; and
a conduit for providing the generated workflow object to a workflow system for workflow handling, including:
sending the one or more workflow objects to a first assignee associated with the one or more workflow objects,
receiving the one or more workflow objects from the first assignee after the first assignee has performed a first task associated with the one or more workflow objects,
sending the one or more workflow objects to a second assignee associated with the one or more workflow objects according to a first linkage between the first task and a second task, and
receiving the one or more workflow objects from the second assignee after the second assignee has performed the second task.

12. The method of claim 11, further comprising matching templates from prior threads against a current thread to affect generation of workilow items when such templates match a current thread.

13. The computer program of claim 11, wherein the messaging system is one of an e-mail system, an instant messaging system, and an integrated collaboration system.

14. The computer program of claim 11, wherein the messaging system includes functions other than messaging.

15. The computer program of claim 14, wherein the functions other than messaging include calendaring, contact management and note management.

16. The computer program of claim 11, further comprising logic for analyzing the message to determine if a transformation might be warranted and for prompting the user to consider transforming the message.

17. The computer program of claim 11, wherein the trigger is the user selecting a user interface item to signal a desire to transform a message into a workflow object.

18. The computer program of claim 17, wherein the user interface item is a context menu.

19. The computer program of claim 11, further comprising:
logic for analyzing one or more messages to detect a thread of one or more related messages or message parts; and
logic for generating a workflow item or items representing a multi-task process corresponding to the detected thread.

20. The computer program of claim 19, further comprising storage for templates for detected multi-task processes for later comparison against future threads.

21. The computer program of claim 20, further comprising logic for matching templates from prior threads against a current thread to affect generation of workflow items when such templates match a current thread.

22. A computer system including a messaging system and a workflow system, wherein messages are transferred between participants using the messaging system, at least some of the participants are human users of the computer system using the computer system in furtherance of work projects, and wherein the workflow system handles task-based operations in a structured environment, the computer system comprising:
a workflow storage;
a workflow server;
a trigger interface that allows users to indicate when a message is to be transformed into a workflow object;
a transformer coupled to the trigger interface that accepts user input for workflow information not extractable from the message;
logic for transforming the message content to a workflow object,
wherein the workflow object is a structured representation of one or more tasks to be performed by one or more assignees including linkages between tasks,
wherein said inkages between tasks provide at least one of order dependencies among said tasks or rules to link said tasks; and
a conduit for providing the generated workflow object to a workflow system for workflow handling, including:
sending the one or more workflow objects to a first assignee associated with the one or more workflow objects,
receiving the one or more workflow objects from the first assignee after the first assignee has performed a first task associated with the one or more workflow objects, sending the one or more workflow objects to a second assignee associated with the one or more workflow objects according to a first linkage between the first task and a second task, and receiving the one or more workflow objects from the second assignee after the second assignee has performed the second task.

23. The method of claim 1, further comprising sending the one or more workflow objects to a third assignee associated with the one or more workflow objects according to a second linkage between the second task and a third task.

24. The method of claim 1, wherein the first task and the second task comprise a complex workflow process.

25. The method of claim 1, wherein the first task and the second task comprise nested tasks.

* * * * *